Patented Mar. 31, 1925.

1,532,015

UNITED STATES PATENT OFFICE.

JAMES G. E. WRIGHT AND VINITA K. QUACKENBUSH, OF SCHENECTADY, NEW YORK, ASSIGNORS TO GENERAL ELECTRIC COMPANY, A CORPORATION OF NEW YORK.

GAS-IMPERVIOUS MEMBRANE AND PROCESS OF PREPARING SAME.

No Drawing.    Application filed January 28, 1921.  Serial No. 440,778.

*To all whom it may concern:*

Be it known that we, JAMES G. E. WRIGHT and VINITA K. QUACKENBUSH, respectively a subject of the King of Great Britain and a citizen of the United States, residing at Schenectady, county of Schenectady, State of New York, have invented certain new and useful Improvements in Gas-Impervious Membranes and Processes of Preparing Same, of which the following is a specification.

For some technical purposes a flexible sheet material which is impervious to gas is required which will withstand conditions for which common flexible materials are not suited. For example, rubber, varnished cambric and other materials, sometimes used for pneumatic bellows and diaphragms, become brittle at extremely low temperatures, and moreover, rapidly deteriorate with age. Some of the internal animal membranes are impervious to gases, but these membranes stiffen and become hard and brittle when dried. Even when rendered limp by mechanical treatment, the product not only is weak but when wet reverts to its original condition and becomes stiff upon subsequent drying.

In accordance with our present invention we have prepared a new, strong, pliable material, unaffected by low temperature and drying, by converting these animal membranes to a leather-like product while introducing a non-corrosive, hygroscopic material, as, for example, ethylene glycol and glycerine, which softens the membranes and causes them to remain pliable even at the lowest temperatures encountered during severe winter conditions.

Among the various animal membranes which may be subjected to the practice of our invention, we prefer the lining of the throat and the bladder of cattle. Although the entire membranes may be used we prefer the outer layer of the throat and the inner or outer layer of the bladder.

The membranes are first of all washed with dilute ammonia, or a similar detergent, to remove secretions. They are thereupon dried while inflated. After drying the membranes are subjected for about four hours to a suitable dilute solution of a vegetable tanning agent, for example, a one per cent solution of gallic, or tannic acid, in water. This operation is not essential although it is desirable.

The essential step in the practice of our invention consists in introducing into the tissues of the membrane a non-corrosive, hygroscopic material, which has a very low freezing point, that is, below —50° Fahr. While it is possible to obtain a usable material by introducing such a material directly into the membrane tissue without a hardening treatment, the resulting product would be soggy and heavy, and hence unsuited for some technical use. We prefer, therefore, to give the membranes a treatment having an effect upon the tissues which is akin to tanning. The product although not strictly a "leather" is dry to the touch, light in weight, thinner walled than the raw membranes, but is still soft and pliable. The substance best suited to produce this pseudo-tanning effect is nigrosine. It is used conveniently in conjunction with a hygroscopic material, such as a mixture of glycerine and ethylene glycol, both of which are polyhydric alcohols.

The following solution has been used with good results:

|  | Parts by weight. |
|---|---|
| Glycerine | 30 |
| Ethylene glycol | 5.5 |
| Nigrosine | 2 |
| Water | 70 |

Although glycerine alone has a beneficial effect, particularly in rendering the material pliable at low temperatures, it is not as effective as the mixture of glycerine and ethylene glycol. The nigrosine has a tanning effect and acts also as a dye, giving the material a handsome black color.

The membranes should be well agitated in the solution during treatment, a large quantity of the solution preferably being used. After having been subjected to this treatment, the excess moisture is removed, the membranes are dried, preferably while mechanically working or "staking" to increase flexibility.

Membranes treated in this way have been subjected to temperature as low as —80° F. without stiffening. They remain pliable by use under dry conditions, are unaffected by oil and are superior in aging qualities to other flexible membranes heretofore used.

What we claim as new and desire to se- cure by Letters Patent of the United States, is—

1. An internal animal membrane containing glycerine and ethylene glycol.

2. An internal animal membrane modified by treatment with glycerine nigrosine and ethylene glycol, said membrane being impervious to gas, pliable at low temperatures, and withstanding wetting without stiffening upon drying.

3. The process of rendering internal animal membrane capable of withstanding low temperatures and drying while retaining pliability which consists in treating said membrane with a tanning agent, and a non-corrosive, hygroscopic substance consisting in part of ethylene glycol.

4. The process of rendering animal membranes permanently flexible even when subjected to extremely low temperatures or drying which consists in subjecting the same to a tanning agent and thereupon treating the same with a mixture of nigrosine, glycerine and ethylene glycol.

5. The process of rendering gas-impervious animal membranes, unaffected by temperatures as low as $-80°$ F., pliable under dry conditions and unaffected by oil which consists in drying said membrane while in a clean, raw state, thereupon subjecting the same to a dilute vegetable tanning agent, and finally treating said membranes to an excess of a solution consisting by weight of about 70 parts water, 30 parts glycerine, 5.5 parts ethylene glycol, and 2 parts nigrosine.

In witness whereof, we have hereunto set our hands this 27th day of January, 1921.

JAMES G. E. WRIGHT.
VINITA K. QUACKENBUSH.